May 22, 1956  H. T. DOUGHTY  2,746,508
TIRE LUG ASSEMBLY
Filed May 7, 1952
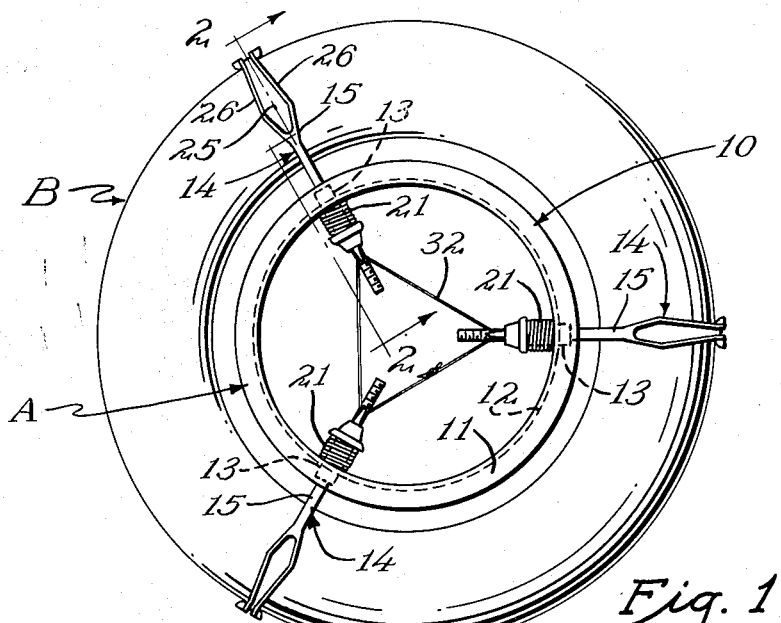
Fig. 1
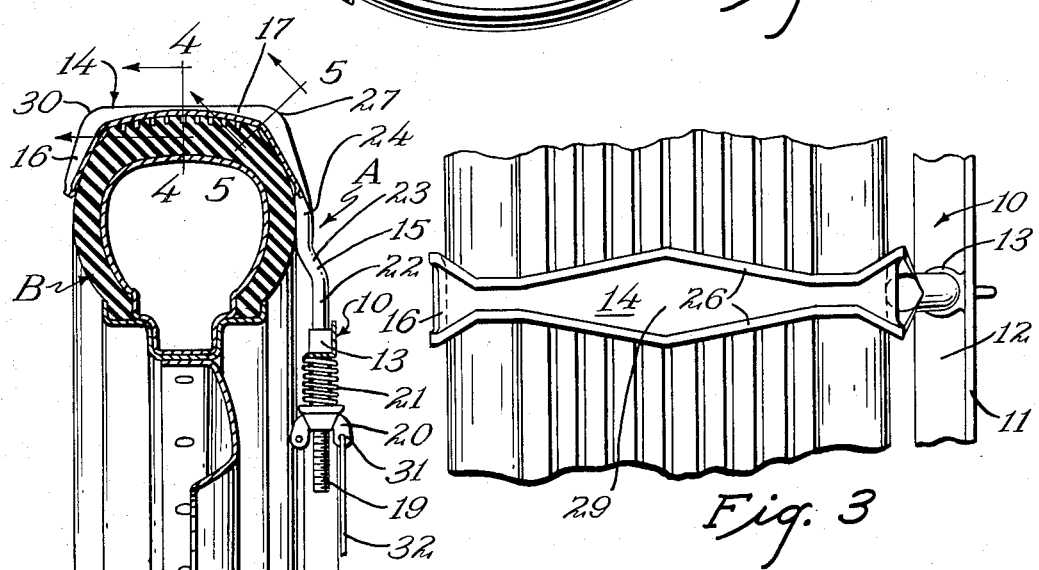
Fig. 2
Fig. 3
Fig. 4
Fig. 5
INVENTOR
Hartwell T. Doughty
BY Robert M. Dunning
ATTORNEY

United States Patent Office 2,746,508
Patented May 22, 1956

2,746,508
TIRE LUG ASSEMBLY
Hartwell T. Doughty, St. Paul, Minn.

Application May 7, 1952, Serial No. 286,542

3 Claims. (Cl. 152—218)

This invention relates to an improvement in tire lug assembly and deals particularly with a device designed to be mounted upon a vehicle tire to prevent slipping of the tire as it travels over a slippery or muddy surface.

Many types of non-skid devices have been produced for preventing the wheel from skidding as the vehicle travels over a slippery surface or travels through mud or the like. Many such devices can not readily be attached to the vehicle wheels without considerable effort. This is particularly true during recent years when the vehicle wheels are enclosed to a greater extent within the fenders or similar portions of the vehicle. It is a primary object of the present invention to provide a device which can be easily applied to a vehicle wheel without the necessity of employing unusual tools and without jacking up the vehicle wheel.

An object of the present invention resides in the provision of a series of angularly spaced lugs which are generally J-shaped in form and which extend over the peripheral surface of the tire. These lugs are preferably attached with the long end of the lug extending radially of the wheel along the outer surface thereof so that the shorter end of the lug overlies the inner wheel surface. With this arrangement the lugs may be hooked over the wheel from the exterior thereof and when properly located and secured in proper relation are held from accidental removal.

A feature of the present invention resides in the provision of a tire lug arrangement which includes a relatively small number of lugs preferably arranged at a substantial angle from one another to facilitate attachment of the lugs to the wheel without jacking up the car or removing the wheel. In the particular embodiment illustrated three lugs are provided which are arranged at one hundred twenty degrees apart so that the lugs may be attached to the wheel while the wheel rests upon the ground. Obviously the number of lugs may be increased if desired, depending upon the advantages desired and the size and type of wheel upon which the lugs are used.

A feature of the present invention resides in the provision of a means for supporting the lugs which includes a relatively rigid ring having affixed thereto a series of radially extending bearings. The longer end of a J-shaped lug is slidably supported in each of the bearings so that the lug may be moved radially with respect to the ring. Spring means are provided for normally urging the lugs toward the center of the ring. As a result as each lug passes between the bottom of the tire and the roadway, the natural compression of the tire permits the lug to move inwardly until the tire again expands. Thus, the lug may remain in contact with the surface of the tire even when the tire is improperly inflated or compresses excessively.

A feature of the present invention resides in the particular shape of the lug itself. Each lug includes a band having a relatively flat undersurface in contact with the surface of the tire. The marginal edges of this band are bent outwardly so as to engage against the icy or snowy surface or to engage into the mud or dirt. The flat portion of the band varies in width so that the edges of the lug may extend to a greater distance from the tire surface where desired. In preferred form the surface of the lug which would contact the icy or snowy surface is substantially flat throughout a considerable length, the marginal flanged edges being relatively short at the center of the tire tread and increasing in length on either side of the crown of the tread. As the strip forming the lug is substantially constant in width at the beginning of the forming operation, the lug is widest at the crown of the tread and over the side walls of the tire and narrower at opposite edges of the tread to produce the substantially flat lug surface.

These and other objects and novel features of my invention will be more clearly and fully set forth in the following specification and claims.

In the drawings forming a part of my specification:

Figure 1 is a side elevation view of a vehicle wheel showing my tire lugs in use thereupon.

Figure 2 is a cross-sectional view through a tire showing the manner in which the lugs extend over the tread of the tire.

Figure 3 is a plan view of a portion of the tire showing the outer appearance of the lug.

Figure 4 is a sectional view through the center portion of the lug, the position of the section being indicated by the line 4—4 of Figure 2.

Figure 5 is a sectional view through a different portion of the lug, the position of the section being indicated by the line 5—5 of Figure 2.

The tire lug structure is indicated in general by the letter A and is designed for mounting upon a vehicle wheel B. The design of wheel may be varied as well as the number of lugs which are used in conjunction with the wheel.

In particular construction illustrated, I provide a mounting ring 10 which is preferably angular in cross section including a flat flange 11 arranged on a flat plane and a cylindrical flange 12 connected at right angles thereto. In preferred form the flange 12 is connected to the inner edge of the ring 10, although this arrangement is to some extent a matter of preference.

Supported by the ring 10 in angularly spaced relation, I provide a series of cylindrical bearings 13 which are arranged on radial axes. These bearings are tangentially secured to the circular ring 11 and abut against and are secured to the cylindrical ring 12. The bearings 13 may be welded or otherwise secured to the ring.

A lug indicated in general by the numeral 14 is slidably supported in each of the bearings 13. Each lug 14 is substantially J-shaped in form including a long arm 15, a short arm 16 and a connecting portion 17. The long arms 15 are designed to extend through the bearings 13 and are provided with threaded extremities such as 19. Wing nuts 20 or other suitable means are mounted upon the threaded lug ends 19 and are used to draw the lug toward the tire B. Springs 21 are interposed between the wing nuts 20 and the cylindrical portion 12 of the ring 10 so as to urge the lugs resiliently against the tire.

The long arms 15 of the lugs usually include a straight end portion 22, part of which is threaded. This straight portion 22 is connected by an inwardly extending off-set 23 to the tire engaging portion 24. The portion 24 need not at all times contact the side wall of the tire, but does lie closely adjacent thereto. The purpose of the off-set 23 is to space the ring 10 outwardly from the body of the wheel. The length of the off-set depends upon the particular construction of the vehicle wheel. In some instances the off-set is substantially double the off-set illustrated where the center portion of the wheel projects outwardly beyond the tire wall a considerable extent.

The connecting portion 17 comprises an elongated strip which is integral with or secured to the portion 24 of the lug. In some instances the lug comprises a bar of material which is flattened at its extremity to produce a strip extending over the tread of the tire. This strip is substantially of equal width throughout its length, but is bent in such a manner that it does not appear of equal width when viewed in plan as in Figure 3 of the drawings.

The connecting portion 17 blends from a circular section to a widest portion 25 at a point substantially spaced from the periphery of the tire. Flanges 26 are provided on opposite sides of the strip extending away from the tire casing to grip the snow, ice or mud. From the widest point 25, the lug decreases in thickness to a point slightly beyond the periphery of the tire tread as indicated at 27. At this point the flanges 26 are of considerable depth as indicated in Figure 5 of the drawings, and the portion of the band in contact with the tire is relatively narrow.

As indicated in Figure 3 of the drawings, the bar tapers in width toward the crown or center point of the tire, being widest at this center point 29. This construction is provided so that the flanges 26 may be substantially flat as viewed in elevation across the tread of the tire. From the center point 29 the flanges increase gradually in depth until they reach the edge of the tread as indicated in Figure 2 by the numeral 30. At this point the lugs bend to form the second arm of the J-shaped form. The band increases in width to the extremity of the arm 16, the edges or flanges decreasing in depth correspondingly.

As indicated in Figures 1 and 2 of the drawings, the wing nuts 20 are preferably perforated as indicated at 31 so as to accommodate a tie cord 32 or other suitable connecting means which tends to prevent rotation of the wing nuts when the wheel is in motion. The tie member 32 is preferably of tough material, although the strain exerted thereupon is usually negligible.

When the lugs are attached to the wheel one lug is usually extended over the top extremity of the wheel, the remaining two lugs extending around the wheel surface somewhat below the center of the wheel. Thus the lugs do not extend about any portion of the tire being compressed by contact with the ground at the time the lugs are attached. The wing nuts are tightened so that the springs 21 are somewhat compressed. The springs 21 encircle the projecting portions of the bearings 13, and in preferred form the wing nuts are tightened against the ends of the bearings 13. The tie cord 32 is next inserted through the apertures 31 of the wing nuts to hold the wing nuts from loosening during rotation of the wheel.

As the tire rotates, each lug is successively moved between the tire and the ground. As the tire compresses due to the weight of the vehicle the lug moves radially inwardly toward the center of the wheel, the corresponding spring 21 expanding sufficiently to permit such motion. As the lug passes the lower point of the wheel, the spring 21 again is compressed by the expansion of the tire until the wing nuts 20 are again engaged against the ends of the bearings 13 which limit outward movement of the lugs. Thus the lugs are maintained in taut condition at all times.

The expansion of the tire tends to hold the tire lugs in adjusted relation. As the portion of the tire beneath the portion 24 of the lug tends to bulge outwardly due to the weight of the vehicle, the part 24 tends to restrict the bulging so that the tire expands on either side of the lug. This action assists in holding the lug in proper position during the rotation of the wheel.

In accordance with the patent statutes, I have described the principles of construction and operation of my tire lug assembly, and while I have endeavored to set forth the best embodiment thereof, I desire to have it understood that obvious changes may be made within the scope of the following claims without departing from the spirit of my invention.

I claim:

1. A tire lug assembly for mounting on a vehicle tired wheel without moving the same, raising the tire or taking the wheel and the tire from the ground comprising in combination a plurality of J-shaped lugs, each having a relatively short leg for engaging and gripping one side of the tire, a relatively long leg having a tire engaging portion for gripping the other side of the tire and a connecting portion having an inner curvature conforming substantially to the curvature across a tire tread, said relatively long leg having a threaded end extremity portion in off-set relation to said tire engaging portion, a mounting ring having angularly spaced bearing means through which each of said long legs radially and slidably extend to support said ring bodily outwardly and free of the vehicle wheel, nut means on the said threaded end extremity of each of the long legs, and spring means mounted on each said offset long leg portion between said mounting ring and said nut means.

2. The structure of claim 1 wherein said mounting ring is provided with angularly spaced bearing means disposed substantially 120° apart.

3. In combination a vehicle tire having placed thereon a lug assembly which is installed on the vehicle tire as a complete set without lifting or movement of the vehicle wheel, said lug assembly comprising a series of spaced lugs including a pair of spaced ribs on each lug, said ribs having substantially coplanar outer edges and said lugs and ribs extending over the tire tread and along the opposite sides of the tire, one portion of said coplanar pair of spaced ribs forming a relatively short leg depending downwardly on one side of the tire, a second portion of said coplanar pair of ribs depending down the other side of the tire and extending in offset relation as a relatively long leg having a threaded extremity, a mounting ring spaced outwardly of the body of the vehicle tire securing the series of lugs in spaced independent ground touching relation on the tire, adjustable nut fastening means on said threaded extremities, and spring means between said mounting ring and said adjustable nut means for varying the tension of the clamping pressure of said series of spaced lugs.

References Cited in the file of this patent

UNITED STATES PATENTS

| | | |
|---|---|---|
| 1,195,165 | Baker | Aug. 15, 1916 |
| 1,229,783 | Pogue | June 12, 1917 |
| 1,348,402 | Gahring | Aug. 3, 1920 |
| 1,424,524 | Seavey | Aug. 1, 1922 |
| 1,882,376 | Weber | Oct. 11, 1932 |
| 1,988,240 | Ellis | Jan. 15, 1935 |
| 2,205,689 | Fischer | June 25, 1940 |
| 2,212,076 | Rollings | Aug. 20, 1940 |
| 2,397,277 | Lawrence | Mar. 26, 1946 |
| 2,434,017 | Snedeker | Jan. 6, 1948 |